(12) United States Patent
Hosseini et al.

(10) Patent No.: US 12,219,529 B2
(45) Date of Patent: Feb. 4, 2025

(54) RESOURCE SELECTION FOR SIDELINK COORDINATION INFORMATION REPORT MESSAGES

(71) Applicant: QUALCOMM Incorporated, San Diego, CA (US)

(72) Inventors: Seyedkianoush Hosseini, San Diego, CA (US); Tugcan Aktas, La Jolla, CA (US); Wei Yang, San Diego, CA (US); Yi Huang, San Diego, CA (US); Peter Gaal, San Diego, CA (US); Wanshi Chen, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 17/444,408

(22) Filed: Aug. 4, 2021

(65) Prior Publication Data
US 2022/0046601 A1   Feb. 10, 2022

Related U.S. Application Data

(60) Provisional application No. 62/706,299, filed on Aug. 7, 2020.

(51) Int. Cl.
*H04W 72/02* (2009.01)
*H04W 72/0446* (2023.01)
*H04W 72/1263* (2023.01)

(52) U.S. Cl.
CPC ....... *H04W 72/02* (2013.01); *H04W 72/0446* (2013.01); *H04W 72/1263* (2013.01)

(58) Field of Classification Search
CPC ............ H04W 72/02; H04W 72/0446; H04W 72/1263
See application file for complete search history.

(56) References Cited

U.S. PATENT DOCUMENTS

| | | | |
|---|---|---|---|
| 11,456,826 B2 * | 9/2022 | Cao | H04L 1/1893 |
| 11,601,789 B2 * | 3/2023 | Panteleev | H04W 72/1263 |
| 2009/0312029 A1 * | 12/2009 | Ananthanarayanan | H04M 1/724 455/450 |
| 2018/0146494 A1 * | 5/2018 | Khoryaev | H04W 76/15 |
| 2019/0182639 A1 * | 6/2019 | Basu Mallick | H04W 72/23 |
| 2020/0045715 A1 * | 2/2020 | Li | H04W 72/1263 |
| 2020/0305187 A1 * | 9/2020 | Takeda | H04W 72/1268 |
| 2020/0351669 A1 * | 11/2020 | Xu | H04W 72/56 |
| 2021/0385804 A1 * | 12/2021 | Ye | H04W 72/20 |
| 2022/0231803 A1 * | 7/2022 | Kiriyama | H04L 5/0042 |
| 2022/0304032 A1 * | 9/2022 | Hahn | H04W 76/14 |
| 2022/0312386 A1 * | 9/2022 | Sun | H04B 7/0408 |
| 2022/0408481 A1 * | 12/2022 | Lee | H04W 24/10 |

\* cited by examiner

*Primary Examiner* — Brian P Cox
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration of a set of resources for sidelink coordination information reports. The UE may transmit a sidelink coordination information report message in at least one resource selected from the set of resources for sidelink coordination information reports. Numerous other aspects are provided.

30 Claims, 13 Drawing Sheets

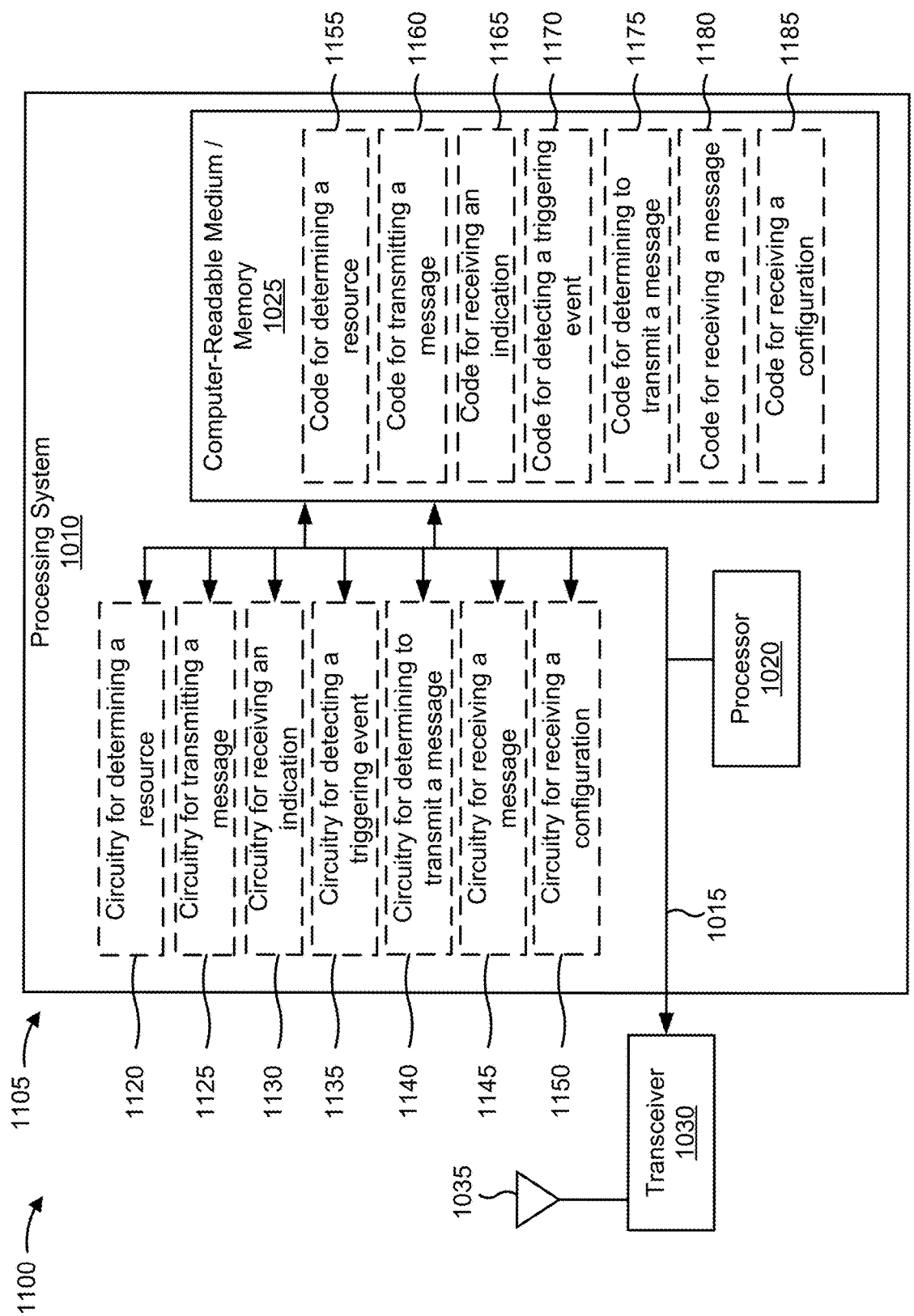

RESOURCE SELECTION FOR SIDELINK COORDINATION INFORMATION REPORT MESSAGES

CROSS-REFERENCE TO RELATED APPLICATION

This patent application claims priority to U.S. Provisional Patent Application No. 62/706,299, filed on Aug. 7, 2020, entitled "RESOURCE SELECTION FOR SIDELINK COORDINATION INFORMATION REPORT MESSAGES," and assigned to the assignee hereof. The disclosure of the prior application is considered part of and is incorporated by reference into this patent application.

INTRODUCTION

Aspects of the present disclosure generally relate to wireless communication and to techniques and apparatuses for resource selection.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive a configuration of a set of resources for sidelink coordination information reports. The one or more processors may be configured to transmit a sidelink coordination information report message in at least one resource selected from the set of resources for sidelink coordination information reports.

Some aspects described herein relate to a UE for wireless communication. The UE may include a memory and one or more processors coupled to the memory. The one or more processors may be configured to receive a sidelink coordination information request message. The one or more processors may be configured to transmit a sidelink coordination information report message in at least one resource selected from a set of resources for sidelink coordination information reports.

Some aspects described herein relate to a UE for wireless communication. The UE may include a memory and one or more processors coupled to the memory. The one or more processors may be configured to receive a configuration of a set of resources for sidelink coordination information reports. The one or more processors may be configured to receive a sidelink coordination information report message in at least one resource from the set of resources for sidelink coordination information reports.

Some aspects described herein relate to a UE for wireless communication. The UE may include a memory and one or more processors coupled to the memory. The one or more processors may be configured to transmit a sidelink coordination information request message. The one or more processors may be configured to receive a sidelink coordination information report message in at least one resource from a set of resources for sidelink coordination information reports.

Some aspects described herein relate to a method of wireless communication performed by a UE. The method may include receiving a configuration of a set of resources for sidelink coordination information reports. The method may include transmitting a sidelink coordination information report message in at least one resource selected from the set of resources for sidelink coordination information reports.

Some aspects described herein relate to a method of wireless communication performed by a UE. The method may include receiving a sidelink coordination information request message. The method may include transmitting a sidelink coordination information report message in at least one resource selected from a set of resources for sidelink coordination information reports.

Some aspects described herein relate to a method of wireless communication performed by a UE. The method may include receiving a configuration of a set of resources for sidelink coordination information reports. The method may include receiving a sidelink coordination information report message in at least one resource from the set of resources for sidelink coordination information reports.

Some aspects described herein relate to a method of wireless communication performed by a UE. The method may include transmitting a sidelink coordination information request message. The method may include receiving a sidelink coordination information report message in at least one resource from a set of resources for sidelink coordination information reports.

Some aspects described herein relate to a non-transitory computer-readable medium that stores a set of instructions for wireless communication by a UE. The set of instructions, when executed by one or more processors of the UE, may cause the UE to receive a configuration of a set of resources for sidelink coordination information reports. The set of instructions, when executed by one or more processors of the UE, may cause the UE to transmit a sidelink coordination information report message in at least one resource selected from the set of resources for sidelink coordination information reports.

Some aspects described herein relate to a non-transitory computer-readable medium that stores a set of instructions for wireless communication by a UE. The set of instructions, when executed by one or more processors of the UE, may cause the UE to receive a sidelink coordination information request message. The set of instructions, when executed by one or more processors of the UE, may cause the UE to transmit a sidelink coordination information report message in at least one resource selected from a set of resources for sidelink coordination information reports.

Some aspects described herein relate to a non-transitory computer-readable medium that stores a set of instructions for wireless communication by a UE. The set of instructions, when executed by one or more processors of the UE, may cause the UE to receive a configuration of a set of resources for sidelink coordination information reports. The set of instructions, when executed by one or more processors of the UE, may cause the UE to receive a sidelink coordination information report message in at least one resource from the set of resources for sidelink coordination information reports.

Some aspects described herein relate to a non-transitory computer-readable medium that stores a set of instructions for wireless communication by a UE. The set of instructions, when executed by one or more processors of the UE, may cause the UE to transmit a sidelink coordination information request message. The set of instructions, when executed by one or more processors of the UE, may cause the UE to receive a sidelink coordination information report message in at least one resource from a set of resources for sidelink coordination information reports.

Some aspects described herein relate to an apparatus for wireless communication. The apparatus may include means for receiving a configuration of a set of resources for sidelink coordination information reports. The apparatus may include means for transmitting a sidelink coordination information report message in at least one resource selected from the set of resources for sidelink coordination information reports.

Some aspects described herein relate to an apparatus for wireless communication. The apparatus may include means for receiving a sidelink coordination information request message. The apparatus may include means for transmitting a sidelink coordination information report message in at least one resource selected from a set of resources for sidelink coordination information reports.

Some aspects described herein relate to an apparatus for wireless communication. The apparatus may include means for receiving a configuration of a set of resources for sidelink coordination information reports. The apparatus may include means for receiving a sidelink coordination information report message in at least one resource from the set of resources for sidelink coordination information reports.

Some aspects described herein relate to an apparatus for wireless communication. The apparatus may include means for transmitting a sidelink coordination information request message. The apparatus may include means for receiving a sidelink coordination information report message in at least one resource from a set of resources for sidelink coordination information reports.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example of an implementation of code and circuitry for an apparatus, in accordance with the present disclosure.

DETAILED DESCRIPTION

Figure 1:
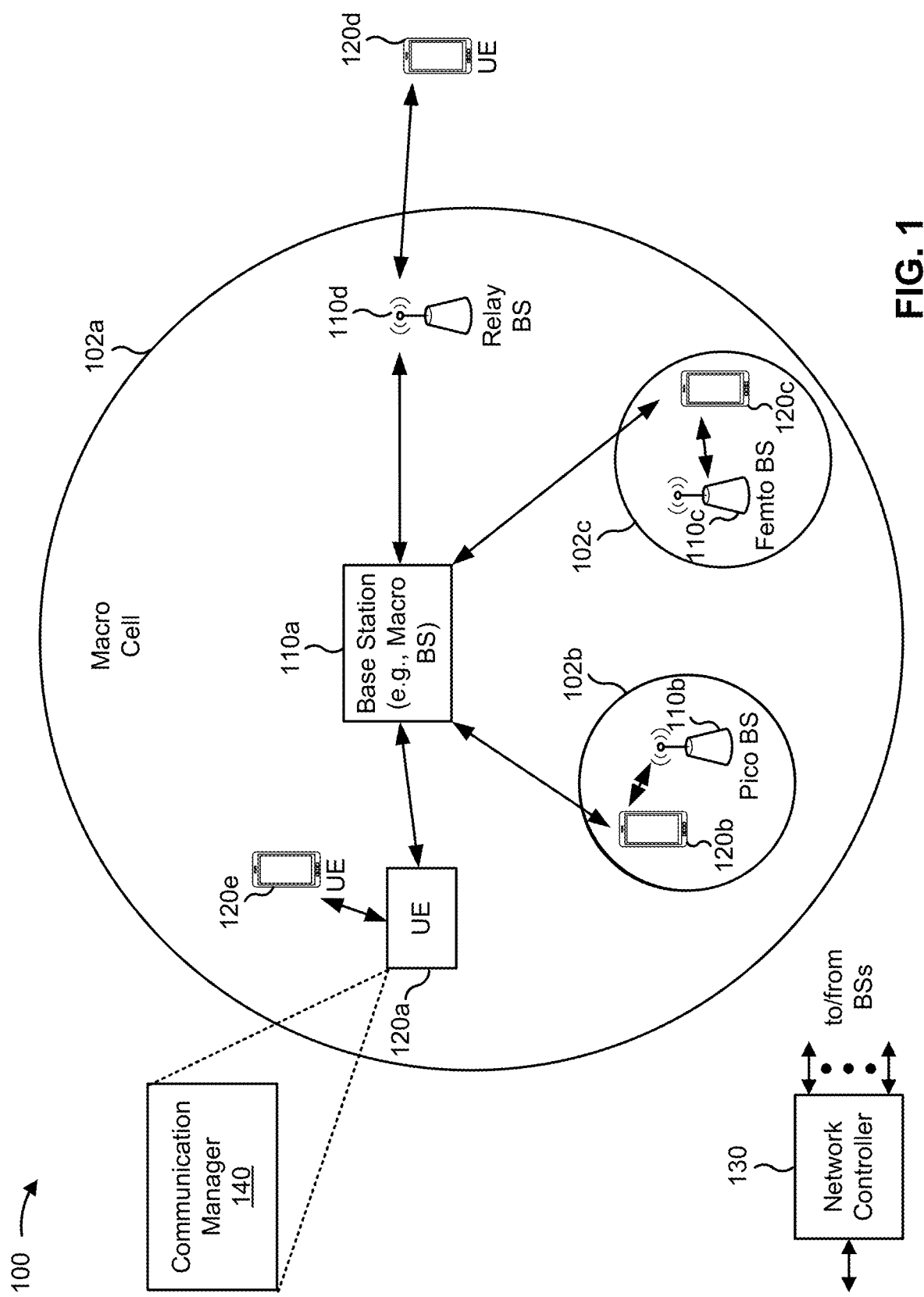
FIG. 1 is a diagram illustrating an example of a wireless network, in accordance with the present disclosure.

Inter-user equipment (UE) coordination enables a first UE to perform resource selection in order to facilitate sidelink communications by a second UE. For example, the second UE, or a base station, may transmit an inter-UE coordination request that the first UE perform an inter-UE coordination operation. The first UE may identify a set of resources in a selection window based at least in part on receiving the inter-UE coordination request and based at least in part on a sensing operation, and may transmit an inter-UE coordination message to the second UE indicating the set of resources. The second UE may select a resource of the set of resources and may communicate on the selected resource.

A UE engaged in sidelink communication may be configured with resources that are to be used to transmit and/or receive reports of sidelink inter-UE coordination information (which may be referred to as reporting resources). Accordingly, a UE may need to select reporting resources that are to be used for transmitting sidelink inter-UE coordination information. In particular, a UE may need to select a reporting resource so as to reduce collision in reporting resources, and/or the like.

Some techniques and apparatuses described herein enable a UE to select reporting resources that are to be used for transmitting sidelink inter-UE coordination information, and specifically, in scenarios in which multiple reporting resources are available for use in responding to a request for coordination information, scenarios in which the UE determines to transmit coordination information without a request, and/or the like. For example, a UE may select reporting resources according to an indication from a base station, may select reporting resources at random, may select reporting resources according to an indexing of the reporting resources and based at least in part on an identifier of the UE or an identifier of a UE that is to receive the report, and/or may select reporting resources based at least in part on a virtual coordination information request. In this way, a performance of reports for sidelink inter-UE coordination information may be improved by reducing collision in reporting resources, wireless resources may be conserved, UE power consumption may be reduced, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with UEs and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a communication manager 140. As described in more detail elsewhere herein, the communication manager 140 may provide means for receiving a configuration of a set of resources for sidelink coordination information reports, means for transmitting or receiving a sidelink coordination information request message, means for determining at least one resource for use in transmitting or receiving a sidelink coordination information report message from the set of resources for sidelink coordination information reports, or means for transmitting or receiving the sidelink coordination information report message in the at least one resource. Additionally, or alternatively, the communication manager 140 may perform one or more other operations described herein.

As indicated above, FIG. 1 is provided as an example. Other examples may differ from what is described with regard to FIG. 1.

Figure 2:
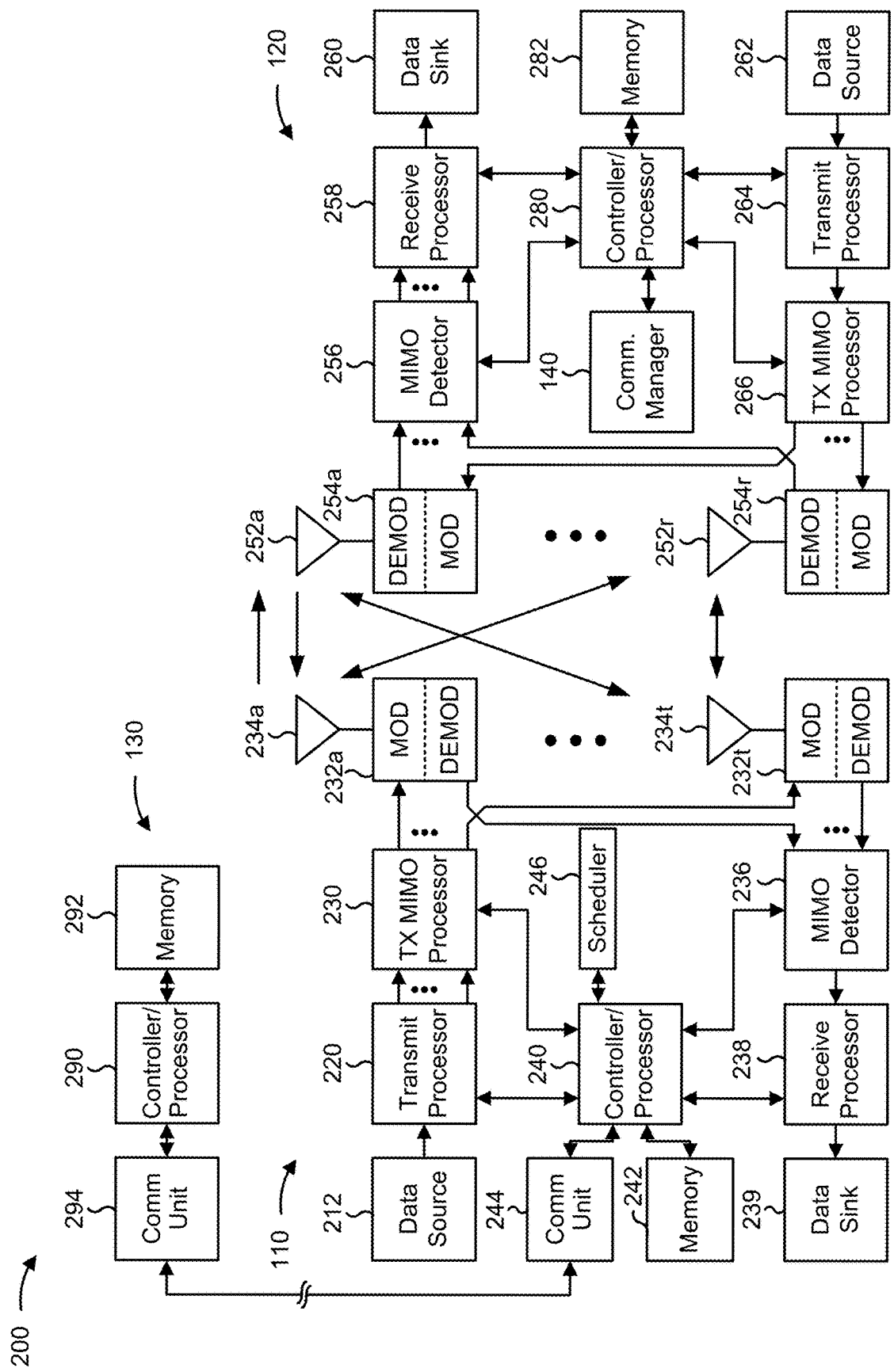
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may provide means for transmitting data or control information, among other examples, to, for example, UE 120. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. The controller/processor 280 may provide, for UE 120, means for determining, identifying, or selecting, among other examples, such as using a determination circuit, an identification circuit, a selection circuit, and/or the like. The receive processor 258 may provide, for UE 120, means for receiving data or control information, among other examples, from, for example, base station 110. A channel processor may determine a reference signal received power (RSRP) parameter, a received signal strength indicator (RSSI) parameter, a reference signal received quality (RSRQ) parameter, and/or a channel quality indicator (CQI) parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. The transmit processor 264 may provide, for UE 120, means for transmitting data or control information, among other examples, to, for example, base station 110. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide, for base station 110, means for receiving data or control information, among other examples, from, for example, UE 120. Receive processor 238 may provide the decoded data to a data sink 239 and the decoded control information to controller/processor 240. The controller/processor 240 may provide means for, for example, determining, selecting, identifying, or detecting, among other examples. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with resource selection for sidelink coordination information report messages, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE 120 may include means for receiving a configuration of a set of resources for sidelink coordination information reports, means for transmitting or receiving a sidelink coordination information request message, means for determining at least one resource for use in transmitting or receiving a sidelink coordination information report message from the set of resources for sidelink coordination information reports, means for transmitting or receiving the sidelink coordination information report message in the at least one resource, and/or the like. Additionally, or alternatively, the UE 120 may include means for performing one or more other operations described herein. In some aspects, such means may include the communication manager 140. Additionally, or alternatively, such means may include one or more other components of the UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3A:
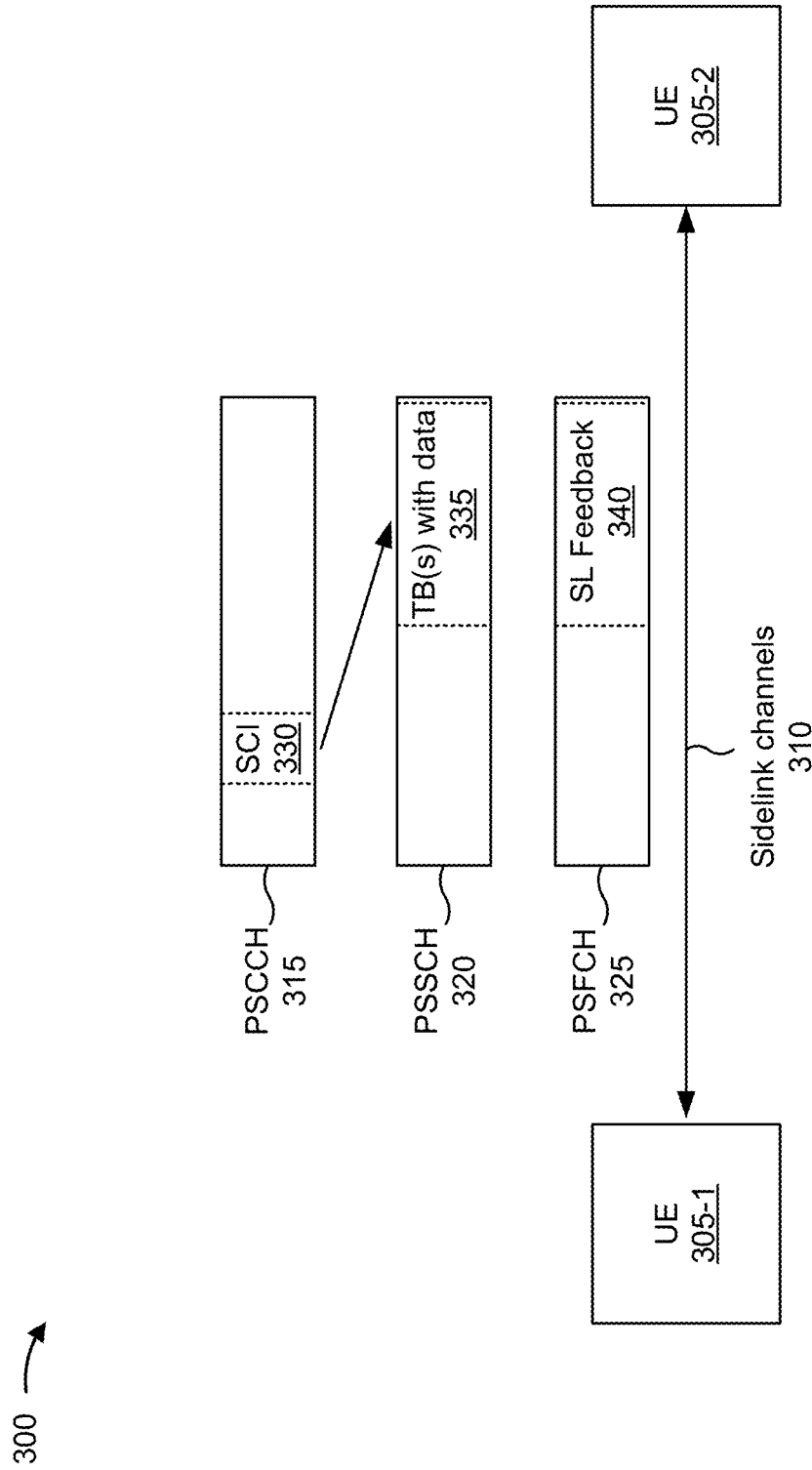
FIGS. 3A and 3B are diagrams illustrating an example of sidelink communications, in accordance with the present disclosure.
Figure 3B:
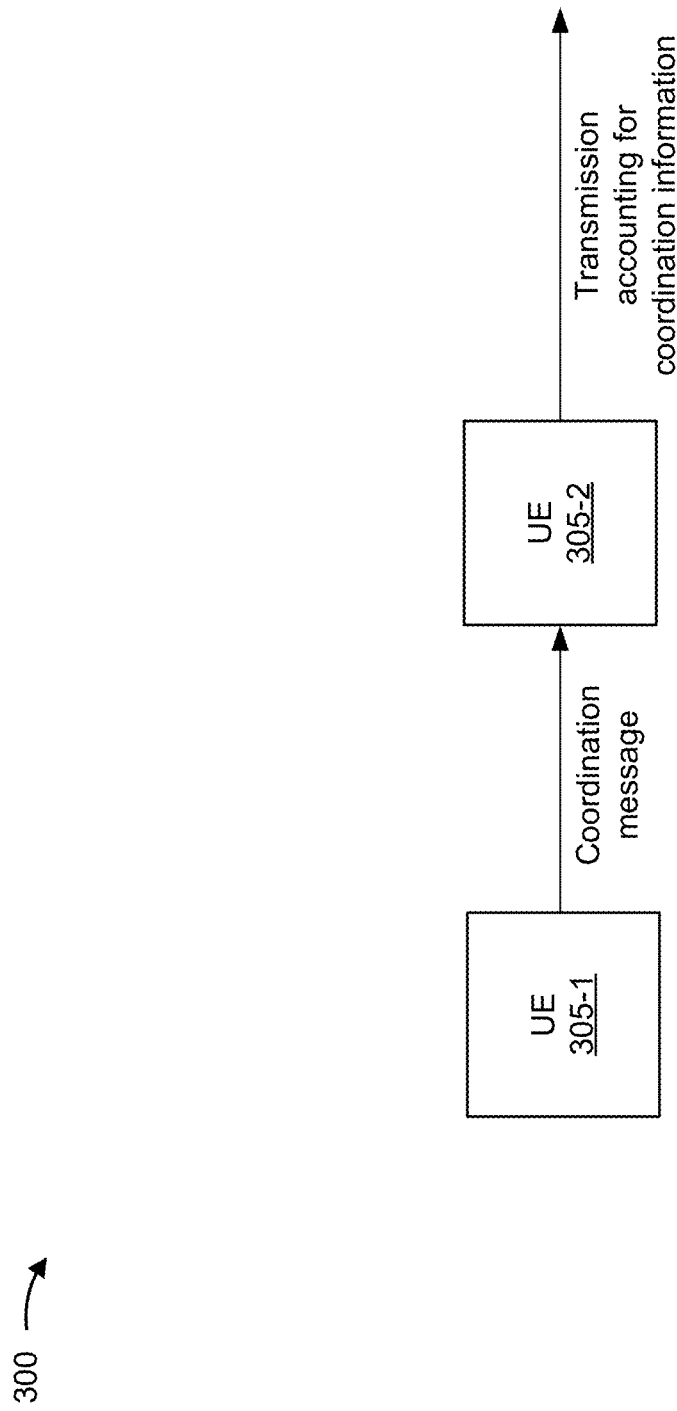

FIGS. 3A and 3B are diagrams illustrating an example 300 of sidelink communications, in accordance with the present disclosure.

As shown in FIG. 3A, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-pedestrian (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3A, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

FIG. 3B shows coordination signaling between the first UE 305-1 and the second UE 305-2. In particular, the first UE 305-1 may exchange inter-UE coordination signaling with the second UE 305-2. The first UE 305-1 and the second UE 305-2 may operate in an in-coverage mode, a partial coverage mode, an out-of-coverage mode, and/or the like.

In some aspects, the first UE 305-1 may determine a set of sidelink resources available for a resource allocation. The first UE 305-1 may determine the set of sidelink resources based at least in part on determining that the set of sidelink resources are to be selected, or based at least in part on an inter-UE coordination request received from the second UE 305-2 or a base station. In some aspects, the first UE 305-1 may determine the set of sidelink resources based at least in part on a sensing operation, which may be performed before receiving an inter-UE coordination request or after receiving the inter-UE coordination request.

The first UE 305-1 may transmit information (e.g., sidelink inter-UE coordination information) identifying the set of available resources to the second UE 305-2 via inter-UE coordination signaling. The first UE 305-1 may transmit the set of available resources using an NR sidelink resource allocation mode 2. In the NR sidelink resource allocation mode 2, resource allocation is handled by UEs (e.g., in comparison to an NR sidelink resource allocation mode 1, in which resource allocation is handled by a scheduling entity such as a base station). The second UE 305-2 may select a sidelink resource for a transmission from the second UE 305-2 based at least in part on the set of available resources identified by the first UE 305-1. As shown, the second UE 305-2 may perform the transmission accounting for the coordination information (e.g., via a sidelink resource indicated by the coordination information, and/or the like).

In this way, the inter-UE coordination signaling may reduce resource collisions (e.g., in half duplex operation) between the first UE 305-1, the second UE 305-2, and/or another UE (e.g., a hidden node), which may thereby reduce consecutive packet loss. Moreover, the inter-UE coordination signaling may reduce a power consumption for the first UE 305-1 and/or the second UE 305-2.

As indicated above, FIGS. 3A and 3B are provided as an example. Other examples may differ from what is described with respect to FIGS. 3A and 3B.

Figure 4:
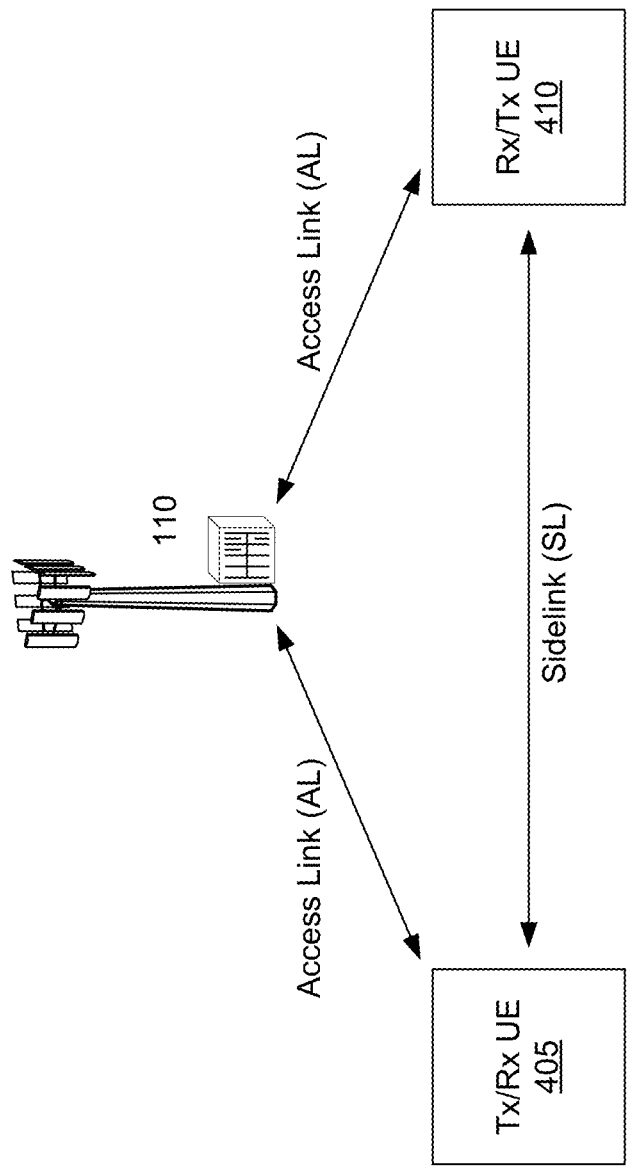
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, a sidelink coordination information request and/or a sidelink coordination information response may be transmitted via the sidelink, as described below. In some aspects, a sidelink coordination information request or a resource assignment may be transmitted via the access link, as described below.

As indicated above, FIG. 4 is provided as an example. Other examples may differ from what is described with respect to FIG. 4.

Figure 5A:
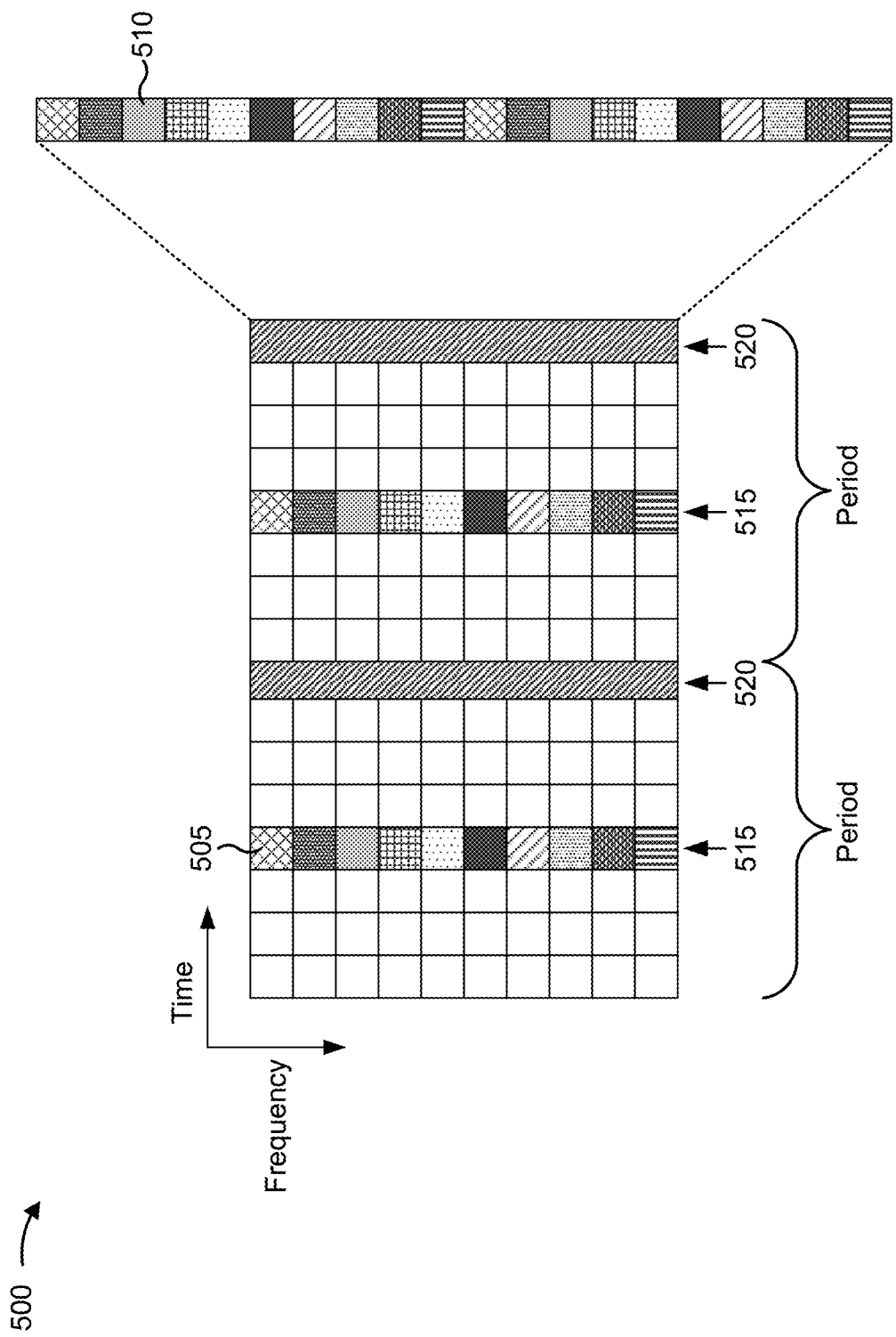
FIGS. 5A and 5B are diagrams illustrating examples of requesting and reporting resources for sidelink inter-UE coordination information, in accordance with the present disclosure.
Figure 5B:
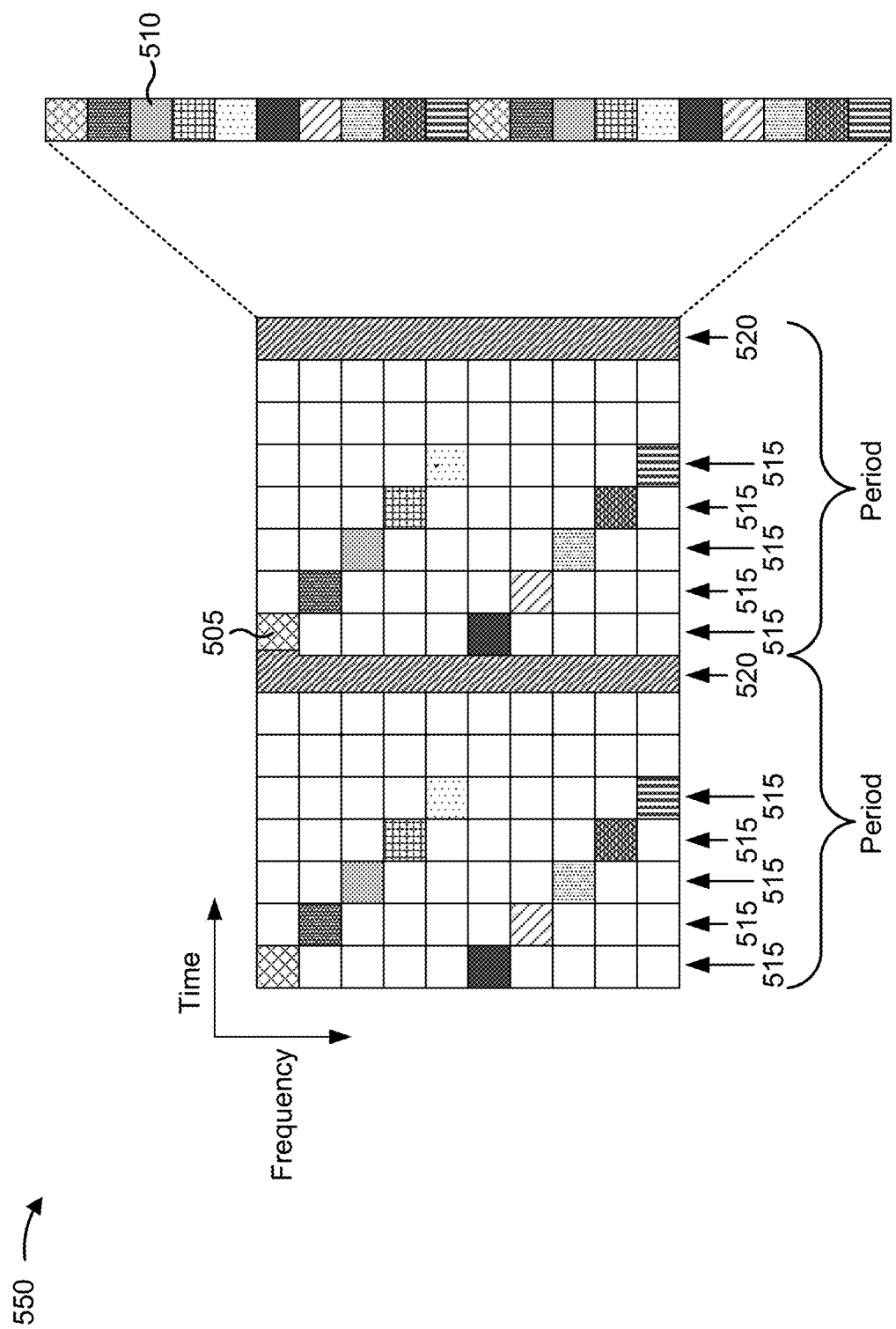

FIGS. 5A and 5B are diagrams illustrating examples 500 and 550 of requesting and reporting resources for sidelink inter-UE coordination information, in accordance with the present disclosure.

A UE engaged in sidelink communication may be configured with resources 505 (e.g., time and/or frequency resources) that are to be used to transmit and/or receive requests for sidelink inter-UE coordination information (which may be referred to as requesting resources), and/or resources 510 (e.g., time and/or frequency resources) that are to be used to transmit and/or receive reports of sidelink inter-UE coordination information (which may be referred to as reporting resources). A requesting resource 505 or a reporting resource 510 may include one or more sub-channels (e.g., of a sidelink resource pool) in a frequency domain and one slot in a time domain; however, other configurations are possible (e.g., multiple slots in a time domain). In some aspects, a reporting resource 510 and a requesting resource 505 may differ in size in a frequency domain and/or in a time domain.

The requesting resources 505 and the reporting resources 510 may be configured with a particular periodicity (e.g., the requesting resources 505 and the reporting resources 510 may be configured with the same periodicity or different periodicities). Each periodic occasion of the requesting resources 505 may be referred to as a requesting occasion 515, and each periodic occasion of the reporting resources 510 may be referred to as a reporting occasion 520. The reporting occasions 520 on the right side of FIGS. 5A and 5B are shown enlarged to illustrate the reporting resources 510.

In some aspects, if inter-UE coordination information is requested in a particular requesting occasion 515, then responsive inter-UE coordination information may be reported in the next reporting occasion 520 following the particular requesting occasion 515. That is, a requesting occasion 515 may be associated with a reporting occasion 520 that is to be used for responding to a request for inter-UE coordination information that was transmitted in the requesting occasion 515.

In some aspects, a requesting resource 505 may be mapped to one or more reporting resources 510. For example, in the examples 500 and 550, a requesting resource 505 shown with a particular fill may be mapped to one or more reporting resources 510 shown in the same fill. A UE may be configured with a mapping between requesting resources 505 and reporting resources 510, such as in a sidelink resource pool configuration. The mapping may indicate particular reporting resource(s) 510 that are to be used for responding to a request for inter-UE coordination information that was transmitted in a particular requesting resource 505 (e.g., according to a mapping between the particular requesting resource 505 and the particular reporting resource(s) 510).

In the example 500, the requesting resources 505 may be in a single requesting occasion 515 per period. That is, the requesting resources 505 may be in a single sidelink slot per period. The single requesting occasion 515 may be associated with a single reporting occasion 520 per period (or multiple reporting occasions 520 per period).

In the example 550, the requesting resources 505 may be distributed over multiple requesting occasions 515 per period. That is, the requesting resources 505 may be in multiple slots per period. The multiple requesting occasions 515 may be associated with a single reporting occasion 520 per period (or multiple reporting occasions 520 per period).

A UE may need to select reporting resources that are to be used for transmitting sidelink inter-UE coordination information. In particular, a UE may need to select a reporting resource when multiple reporting resources are available for use in responding to a request for coordination information, when the UE determines to transmit coordination information without a request, and/or the like. Some techniques and apparatuses described herein enable a UE to select reporting resources that are to be used for transmitting sidelink inter-UE coordination information and, specifically, in scenarios in which multiple reporting resources are available for use in responding to a request for coordination information, scenarios in which the UE determines to transmit coordination information without a request, and/or the like. In this way, a performance of reports for sidelink inter-UE coordination information may be improved, wireless resources may be conserved, UE power consumption may be reduced, and/or the like.

As indicated above, FIGS. 5A and 5B are provided as examples. Other examples may differ from what is described with respect to FIGS. 5A and 5B.

Figure 6:
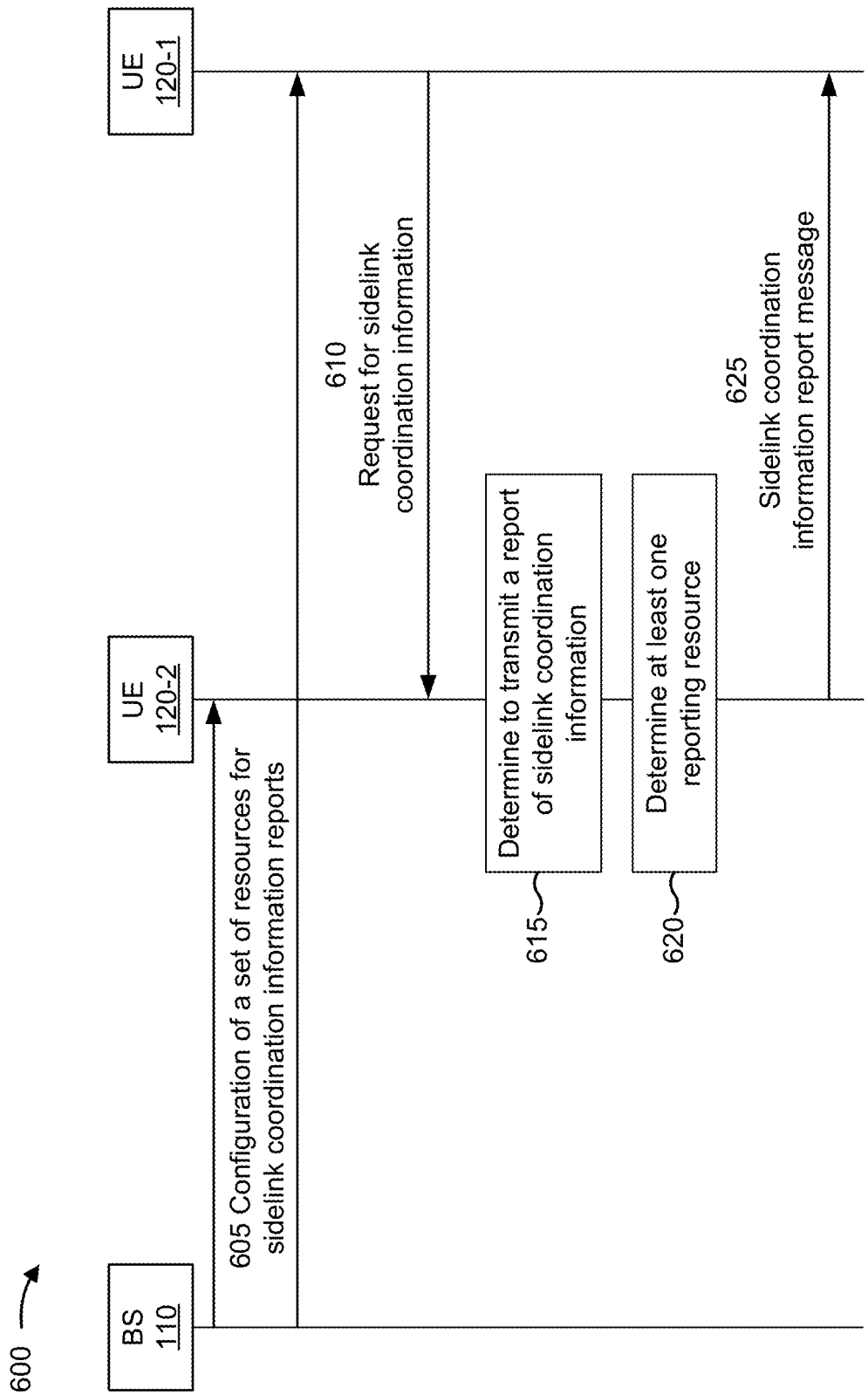
FIG. 6 is a diagram illustrating an example associated with resource selection for sidelink coordination information report messages, in accordance with the present disclosure.

FIG. 6 is a diagram illustrating an example 600 associated with resource selection for sidelink coordination information report messages, in accordance with the present disclosure. As shown in FIG. 6, example 600 includes communication between a BS 110, a first UE 120-1, and a second UE 120-2. In some aspects, the first UE 120-1 and the second UE 120-2 may correspond to a UE 305, a UE 405, a UE 410, and/or the like.

In some aspects, the first UE 120-1 may transmit one or more requests for sidelink inter-UE coordination information, and may be referred to herein as a requesting UE 120-1. In some aspects, the second UE 120-2 may transmit one or more reports of sidelink inter-UE coordination information (e.g., in response to a request from the requesting UE 120-1), and may be referred to herein as a reporting UE 120-2. In some aspects, the requesting UE 120-1 may also transmit one or more reports of sidelink coordination information, and the reporting UE 120-2 may also transmit one or more requests for sidelink coordination information, as described herein.

In some aspects, the requesting UE 120-1 and the reporting UE 120-2 may be included in a wireless network, such as wireless network 100. In some aspects, the requesting UE 120-1 and the reporting UE 120-2 may communicate on a wireless sidelink, as described above in connection with FIGS. 3A and 4. As described above, the requesting UE 120-1 and/or the reporting UE 120-2 may be configured with reporting resources for sidelink inter-UE coordination information requests. For example, as shown by reference number 605, the requesting UE 120-1 and/or the reporting UE 120-2 may receive (e.g., from BS 110) a configuration of a set of resources for sidelink coordination information reports.

As shown by reference number 610, the requesting UE 120-1 may transmit, and the reporting UE 120-2 may receive, a request for sidelink coordination information. For example, the requesting UE 120-1 may transmit the request based at least in part on a determination that the requesting UE 120-1 is experiencing collision of sidelink communications, experiencing sidelink packet loss, and/or the like. In some aspects, the reporting UE 120-2 may receive a request for sidelink coordination information from a base station (e.g., a base station 110). For example, the base station may transmit the request based at least in part on a determination that one or more UEs engaged in sidelink communication are experiencing collision of sidelink communications, experiencing sidelink pack loss, and/or the like.

The reporting UE 120-2 may receive a request for sidelink coordination information in a requesting resource of a requesting occasion. In some aspects, the requesting occasion may be associated with (e.g., may map to) a reporting occasion (e.g., a slot), such as a reporting occasion that immediately follows the requesting occasion. The reporting occasion may include one or more reporting resources for transmitting sidelink coordination information reports. In some aspects, the requesting resource, in which the request for sidelink coordination information is received, may map to one or more reporting resources in the reporting occasion.

As shown by reference number 615, the reporting UE 120-2 may determine to transmit a report of sidelink coordination information. In some aspects, the reporting UE 120-2 may determine to transmit the report based at least in part on receiving a request for sidelink coordination information, as described above. In some aspects, the reporting UE 120-2 may determine to transmit the report without receiving a request for sidelink coordination information. For example, the reporting UE 120-2 may determine to transmit the report based at least in part on information that is locally available to the reporting UE 120-2, based at least in part on a triggering event for reporting sidelink coordination information, based at least in part on a configuration for periodic sidelink coordination information reporting, and/or the like.

As shown by reference number 620, the reporting UE 120-2 may determine at least one reporting resource for use in transmitting a sidelink coordination information report message (e.g., based at least in part on determining to transmit the report of sidelink coordination information). The reporting UE 120-2 may determine (e.g., select) the reporting resource(s) from a set of resources that are to be used for sidelink coordination information reports (e.g., from the reporting resources configured for the reporting UE 120-2), as described above in connection with FIGS. 5A and 5B. The set of resources may be in a reporting occasion, as described above. For example, the set of resources may be in a reporting occasion that follows a requesting occasion in which a request for sidelink coordination information is received, a reporting occasion that follows a determination to transmit a report of sidelink coordination information, and/or the like.

In some aspects, a base station (e.g., a base station 110) may transmit (e.g., directly, or indirectly via a relay), and the reporting UE 120-2 may receive, an indication of the reporting resource(s) that are to be used for the sidelink coordination information message. Accordingly, the reporting UE 120-2 may determine the reporting resource(s) based at least in part on the indication. In some aspects, the indication may indicate the reporting resource(s) for an aperiodic sidelink coordination information report. In some aspects, the indication may indicate the reporting resource(s) for periodic sidelink coordination information reporting. In some aspects, the indication may be included in, or otherwise associated with, a request for sidelink coordination information that is transmitted by the base station.

In some aspects, the reporting UE 120-2 may determine the reporting resource(s) based at least in part on a resource hopping pattern. For example, the reporting UE 120-2 may use the resource hopping pattern to determine the reporting resource(s) in a reporting occasion for periodic reporting. As an example, the resource hopping pattern may indicate first reporting resource(s) for the reporting UE 120-2 in a first reporting occasion for periodic reporting, may indicate second reporting resource(s) for the reporting UE 120-2 in a second reporting occasion for periodic reporting, and so forth (e.g., a reporting period may include multiple reporting occasions, such as multiple slots, that include reporting resources). In this way, the resource hopping pattern may reduce collisions of sidelink coordination information report messages across multiple UEs (e.g., by randomizing reporting resource selection).

In some aspects, the indication, transmitted by the base station, may indicate a resource hopping pattern that is to be used by the reporting UE 120-2 for reporting resource selection (e.g., for periodic reporting). In some aspects, the reporting UE 120-2 may determine (e.g., implicitly derive) a resource hopping pattern that is to be used by the reporting UE 120-2 for reporting resource selection (e.g., for periodic reporting). For example, the reporting UE 120-2 may determine the resource hopping pattern based at least in part on an identifier of the reporting UE 120-2 (e.g., a UE identifier), based at least in part on a time (e.g., a slot) when a report is to be sent, and/or the like.

As described above, the requesting UE 120-1 may transmit a request for sidelink coordination information in a single requesting resource that is mapped to (e.g., associated with) multiple resources of the set of resources used for sidelink coordination information reports. In some aspects, the reporting UE 120-2 may determine the reporting resource(s) to be a subset (e.g., one or more) of the multiple resources. For example, the reporting UE 120-2 may determine the reporting resource(s) to be a fixed subset of the multiple resources. That is, the reporting UE 120-2 may select the same subset of the multiple resources each time the reporting UE 120-2 is to transmit a report message using the multiple resources. As another example, the reporting UE 120-2 may determine the reporting resource(s) to be a random subset of the multiple resources. That is, the reporting UE 120-2 may select a subset of the multiple resources at random each time the reporting UE 120-2 is to transmit a report message using the multiple resources.

In some aspects, each resource of the set of resources used for sidelink coordination information reports may be assigned a respective index value. In some aspects, the set of resources may be consecutively indexed (e.g., in a frequency domain) within a reporting occasion.

In some aspects, the reporting UE 120-2 may determine the reporting resource(s), according to the indexing, and based at least in part on an identifier of the requesting UE 120-1 (e.g., which transmitted the request for sidelink coordination information to which the reporting UE 120-2 is responding), an identifier of the reporting UE 120-2, an identifier of another UE, and/or the like. For example, the reporting UE 120-2 may determine the reporting resource(s) based at least in part on a source identifier associated with a sidelink coordination information request message (e.g., to which the reporting UE 120-2 is responding), a destination identifier associated with the sidelink coordination information request message, and/or the like.

Specifically, the reporting UE 120-2 may determine the reporting resource(s), according to the indexing, and based at least in part on an identifier (e.g., the source identifier of the requesting UE 120-1, the destination identifier of the reporting UE 120-2, and/or the like), a quantity of reporting resources associated with a requesting resource in which the sidelink coordination information request message is received, and/or an offset value. For example, the reporting UE 120-2 may determine an index value of a reporting resource that is to be used by the reporting UE 120-2 by determining a modulo of the identifier, combined with (e.g., multiplied with, summed with, and/or the like) an offset value, and the quantity of reporting resources associated with the requesting resource (e.g., index value=the source identifier+offset value modulo the quantity of resources; index value=the destination identifier+offset value modulo the quantity of resources; and/or the like). As described above, the quantity of resources associated with the reporting occasion may correspond to the quantity of resources in the set of resources.

In some aspects, the offset value may be zero or greater than zero. In some aspects, the offset value may be negotiated between the reporting UE 120-2 and one or more UEs (e.g., the requesting UE 120-1) that are to receive the sidelink coordination information report message. For example, the reporting UE 120-2 may be engaged in unicast communication with the requesting UE 120-1 (or another UE), and the offset value may be zero or another fixed value, or the reporting UE 120-2 may negotiate an offset value with the requesting UE 120-1.

In some aspects, the reporting UE 120-2 may be engaged in groupcast communication with a group of UEs (e.g., which may include the requesting UE 120-1). In one or more examples, if the reporting UE 120-2 is to transmit a single report message to the group of UEs, then the offset value may be zero or another fixed value. Additionally, or alternatively, if the reporting UE 120-2 is to transmit separate report messages to one or more UEs of the group, then the reporting UE 120-2 may negotiate a different offset value with each of the one or more UEs (e.g., the offset value that is used by the reporting UE 120-2 for determining the reporting resource(s) may be different for the one or more UEs).

As described above, the reporting UE 120-2 may autonomously determine to transmit the sidelink coordination information report message in the absence of a request (e.g., based at least in part on a triggering event). In some aspects, the reporting UE 120-2 may detect a triggering event for transmitting the sidelink coordination information report message. In some aspects, the reporting UE 120-2 may determine to transmit the sidelink coordination information report message based at least in part on detecting the triggering event. For example, the triggering event may be reaching a threshold quantity of consecutive lost packets between the reporting UE 120-2 and another UE (e.g., a counter value of consecutive lost packets between the reporting UE 120-2 and another UE satisfying a threshold value).

In some aspects, the reporting UE 120-2 may randomly determine the reporting resource(s) in a next reporting occasion following the triggering event. That is, the reporting UE 120-2 may select the reporting resource(s) at random from the first available reporting occasion following the triggering event.

In some aspects, the reporting UE 120-2 may determine a requesting resource for a virtual (e.g., a fictitious) sidelink coordination information request message in a next requesting occasion following the triggering event. That is, the reporting UE 120-2 may assume that a virtual sidelink coordination information request message was transmitted by another UE in the first available requesting occasion following the triggering event, and the reporting UE 120-2 may determine a requesting resource (e.g., a virtual requesting resource) in the requesting occasion. For example, the reporting UE 120-2 may determine the requesting resource based at least in part on an identifier (e.g., a source identifier) of the reporting UE 120-2, as described above.

Accordingly, the reporting UE 120-2 may determine the reporting resource(s) based at least in part on the determined requesting resource. For example, the reporting UE 120-2 may determine the reporting resource(s) that are associated with (e.g., that map to) the determined requesting resource. A UE that is to receive the sidelink coordination information report message may determine one or more reporting resources that are to potentially carry the report message based at least in part on a list of UEs that are assigned to report to the UE (e.g., using source identifiers of the set of UEs), thereby decreasing a decoding complexity at the UE.

In some aspects, the reporting UE 120-2 may determine the requesting resource based at least in part on an identifier (e.g., a source identifier) of the reporting UE 120-2, as described above. In some aspects, the reporting UE 120-2 may determine the requesting resource based at least in part on an identifier (e.g., a source identifier) of another UE, as described above. For example, the other UE may be a target UE for the sidelink coordination information report message. In some aspects, the other UE may be known to the reporting UE 120-2. For example, the other UE may be associated with the triggering event. As an example, the triggering event for the sidelink coordination information report message may be reaching a threshold quantity of consecutive lost packets in unicast communication between the reporting UE 120-2 and the other UE. In this way, the other UE may determine the reporting resource(s) that are to be used by the reporting UE 120-2, thereby decreasing a decoding complexity at the other UE.

In some aspects, the reporting UE 120-2 may determine the reporting resource(s) according to a periodicity of requesting occasions and/or a periodicity of reporting occasions. For example, the reporting UE 120-2 may determine an index value of a reporting resource that is to be used by the reporting UE 120-2 based at least in part on (e.g., as a function of) the periodicity of requesting occasions and/or the periodicity of reporting occasions. A periodicity may be a quantity of slots, a quantity of symbols, or another time interval, at which a single reporting or requesting occasion repeats or at which a group of multiple reporting or requesting occasions repeat.

As shown by reference number 625, the reporting UE 120-2 may transmit, and the requesting UE 120-1 (and/or one or more other UEs) may receive, one or more sidelink coordination information report messages. The reporting UE 120-2 may transmit the one or more sidelink coordination information report messages (e.g., in a sidelink channel) in the reporting resource(s) determined by the reporting UE 120-2 (and in some cases, a receiving UE may receive the sidelink coordination information report message(s) in reporting resource(s) determined by the receiving UE), as described above. A sidelink coordination information report message may include sidelink inter-UE coordination information, such as information that assists the requesting UE 120-1 in selecting resources for sidelink communication. For example, the sidelink coordination information report message (e.g., a sidelink inter-UE coordination signal) may identify resources selected by the reporting UE 120-2 for a transmission of the requesting UE 120-1. That is, the reporting UE 120-2 (e.g., a helping UE) may schedule the requesting UE 120-1 via the sidelink coordination information.

In this way, reporting resources may be selected so as to minimize blind decoding attempts of reporting resources, reduce collision in reporting resources, and/or the like. In this way, performance of sidelink inter-UE coordination information reports may be improved, wireless resources may be conserved, UE power consumption may be reduced, and/or the like.

As indicated above, FIG. 6 is provided as an example. Other examples may differ from what is described with respect to FIG. 6.

Figure 7:
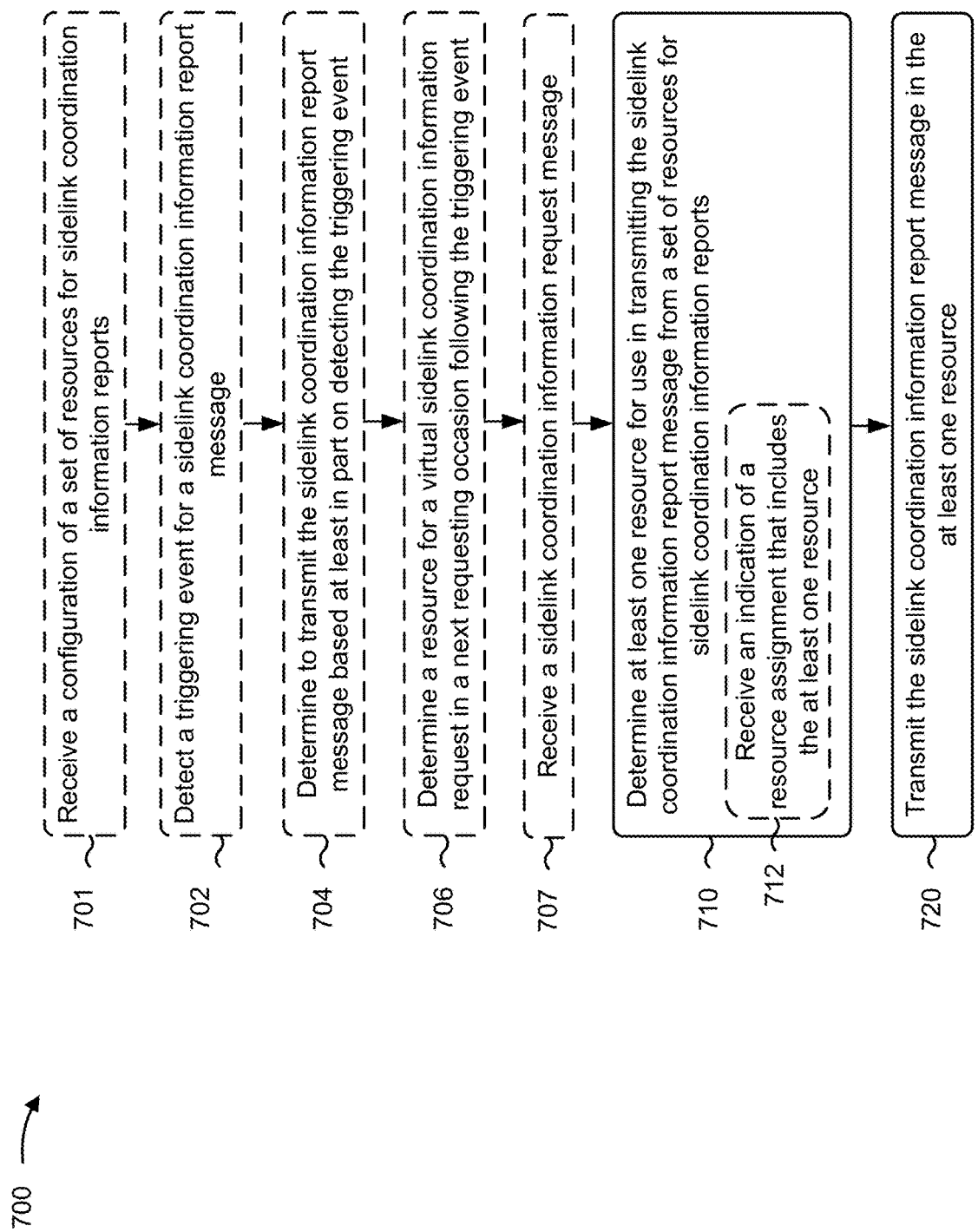
FIG. 7 is a diagram illustrating an example process associated with resource selection for sidelink coordination information report messages, in accordance with the present disclosure.

FIG. 7 is a diagram illustrating an example process 700 performed, for example, by UE, in accordance with the present disclosure. Example process 700 is an example where the UE (e.g., UE 120) performs operations associated with resource selection for sidelink coordination information report messages.

In some aspects, process 700 may include receiving a configuration of a set of resources for sidelink coordination information reports (block 701). For example, the UE (e.g., using antenna 252, DEMOD 254, MIMO detector 256, receive processor 258, controller/processor 280, memory 282, and/or reception component 902) may receive a configuration of a set of resources for sidelink coordination information reports, as described above.

In some aspects, process 700 may include detecting a triggering event for a sidelink coordination information report message (block 702). For example, the UE (e.g., using controller/processor 280, memory 282, and/or detection component 912) may detect a triggering event for a sidelink coordination information report message, as described above.

In some aspects, process 700 may include determining to transmit the sidelink coordination information report message based at least in part on detecting the triggering event (block 704). For example, the UE (e.g., using controller/processor 280, memory 282, and/or determination component 910) may determine to transmit the sidelink coordination information report message based at least in part on detecting the triggering event, as described above.

In some aspects, process 700 may include determining a resource for a virtual sidelink coordination information request in a next requesting occasion following the triggering event (block 706). For example, the UE (e.g., using controller/processor 280, memory 282, and/or determination component 910) may determine a resource for a virtual sidelink coordination information request in a next requesting occasion following the triggering event, as described above.

In some aspects, process 700 may include receiving a sidelink coordination information request message (block 707). For example, the UE (e.g., using antenna 252, DEMOD 254, MIMO detector 256, receive processor 258, controller/processor 280, memory 282, and/or reception component 902) may receive a sidelink coordination information request message, as described above.

As shown in FIG. 7, in some aspects, process 700 may include determining at least one resource for use in transmitting the sidelink coordination information report message from the set of resources for sidelink coordination information reports (block 710). For example, the UE (e.g., using controller/processor 280, memory 282, and/or determination component 910) may determine at least one resource for use in transmitting the sidelink coordination information report message from the set of resources for sidelink coordination information reports, as described above. In some aspects, the at least one resource is determined based at least in part on the resource for the virtual sidelink coordination information request.

In some aspects, process 700 may include receiving an indication of a resource assignment that includes the at least one resource (block 712). For example, the UE (e.g., using antenna 252, DEMOD 254, MIMO detector 256, receive processor 258, controller/processor 280, memory 282, and/or reception component 902) may receive an indication of a resource assignment that includes the at least one resource, as described above.

As further shown in FIG. 7, in some aspects, process 700 may include transmitting the sidelink coordination information report message in the at least one resource (block 720). For example, the UE (e.g., using transmit processor 264, TX MIMO processor 266, MOD 254, antenna 252, controller/processor 280, memory 282, and/or transmission component 906) may transmit the sidelink coordination information report message in the at least one resource, as described above.

Process 700 may include additional aspects, such as any single aspect or any combination of aspects described below and/or in connection with one or more other processes described elsewhere herein.

In a first aspect, process 700 includes receiving an indication of a resource assignment that includes the at least one resource.

In a second aspect, alone or in combination with the first aspect, the at least one resource is determined based at least in part on a resource hopping pattern.

In a third aspect, alone or in combination with one or more of the first and second aspects, multiple resources of the set of resources for sidelink coordination information reports are mapped to a single resource used for a sidelink coordination information request.

In a fourth aspect, alone or in combination with one or more of the first through third aspects, the at least one resource is a fixed subset of the multiple resources.

In a fifth aspect, alone or in combination with one or more of the first through fourth aspects, the at least one resource is a random subset of the multiple resources.

In a sixth aspect, alone or in combination with one or more of the first through fifth aspects, the at least one resource is determined based at least in part on an identifier of another UE that requested the sidelink coordination information report message.

In a seventh aspect, alone or in combination with one or more of the first through sixth aspects, the at least one resource is determined based at least in part on an identifier of the UE.

In an eighth aspect, alone or in combination with one or more of the first through seventh aspects, process 700 includes determining to transmit the sidelink coordination information report message based at least in part on detecting a triggering event for the sidelink coordination information report message.

In a ninth aspect, alone or in combination with one or more of the first through eighth aspects, the at least one resource is randomly determined in a next reporting occasion following the triggering event.

In a tenth aspect, alone or in combination with one or more of the first through ninth aspects, process 700 includes determining a resource for a virtual sidelink coordination information request in a next requesting occasion following the triggering event.

In an eleventh aspect, alone or in combination with one or more of the first through tenth aspects, the at least one resource is determined based at least in part on the resource for the virtual sidelink coordination information request.

In a twelfth aspect, alone or in combination with one or more of the first through eleventh aspects, the at least one resource is determined based at least in part on an identifier of another UE associated with the triggering event.

In a thirteenth aspect, alone or in combination with one or more of the first through twelfth aspects, the at least one resource is selected based at least in part on a periodicity of reporting occasions for sidelink coordination information reports.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
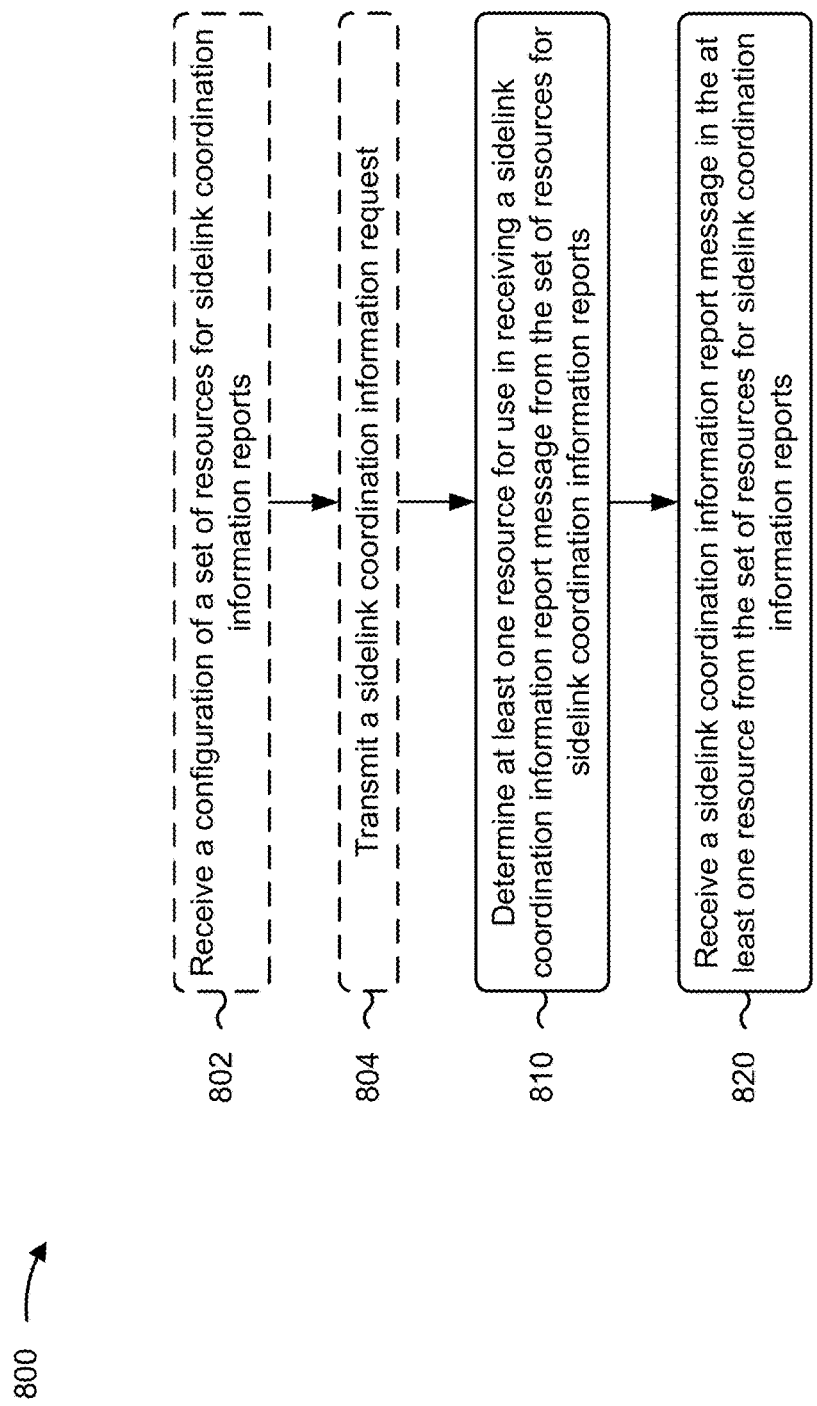
FIG. 8 is a diagram illustrating an example process associated with resource selection for sidelink coordination information report messages, in accordance with the present disclosure.

FIG. 8 is a diagram illustrating an example process 800 performed, for example, by a UE, in accordance with the present disclosure. Example process 800 is an example where the UE (e.g., UE 120) performs operations associated with resource selection for sidelink.

As shown in FIG. 8, in some aspects, process 800 may include receiving a configuration of a set of resources for sidelink coordination information reports (block 802). For example, the UE (e.g., using antenna 252, DEMOD 254, MIMO detector 256, receive processor 258, controller/processor 280, memory 282, and/or reception component 902) may receive a configuration of a set of resources for sidelink coordination information reports, as described above.

In some aspects, process 800 may include transmitting a sidelink coordination information request message (block 804). For example, the UE (e.g., using transmit processor 264, TX MIMO processor 266, MOD 254, antenna 252, controller/processor 280, memory 282, and/or transmission component 906) may transmit a sidelink coordination information request message, as described above.

As shown in FIG. 8, in some aspects, process 800 may include determining at least one resource for use in receiving a sidelink coordination information report message from the set of resources for sidelink coordination information reports (block 810). For example, the UE (e.g., using controller/ processor 280, memory 282, and/or determination component 910) may determine at least one resource for use in receiving a sidelink coordination information report message from the set of resources for sidelink coordination information reports, as described above.

As further shown in FIG. 8, in some aspects, process 800 may include receiving a sidelink coordination information report message in the at least one resource from the set of resources for sidelink coordination information reports (block 820). For example, the UE (e.g., using antenna 252, DEMOD 254, MIMO detector 256, receive processor 258, controller/processor 280, memory 282, and/or reception component 902) may receive a sidelink coordination information report message in the at least one resource from the set of resources for sidelink coordination information reports, as described above.

Process 800 may include additional aspects, such as any single aspect or any combination of aspects described below and/or in connection with one or more other processes described elsewhere herein.

In a first aspect, the at least one resource is based at least in part on an identifier of another UE that transmitted the sidelink coordination information report message or an identifier of the UE.

In a second aspect, alone or in combination with the first aspect, the at least one resource is based at least in part on a periodicity of reporting occasions for sidelink coordination information reports.

In a third aspect, alone or in combination with one or more of the first and second aspects, the UE is associated with a triggering event for the sidelink coordination information report message, and the at least one resource is based at least in part on an identifier of the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
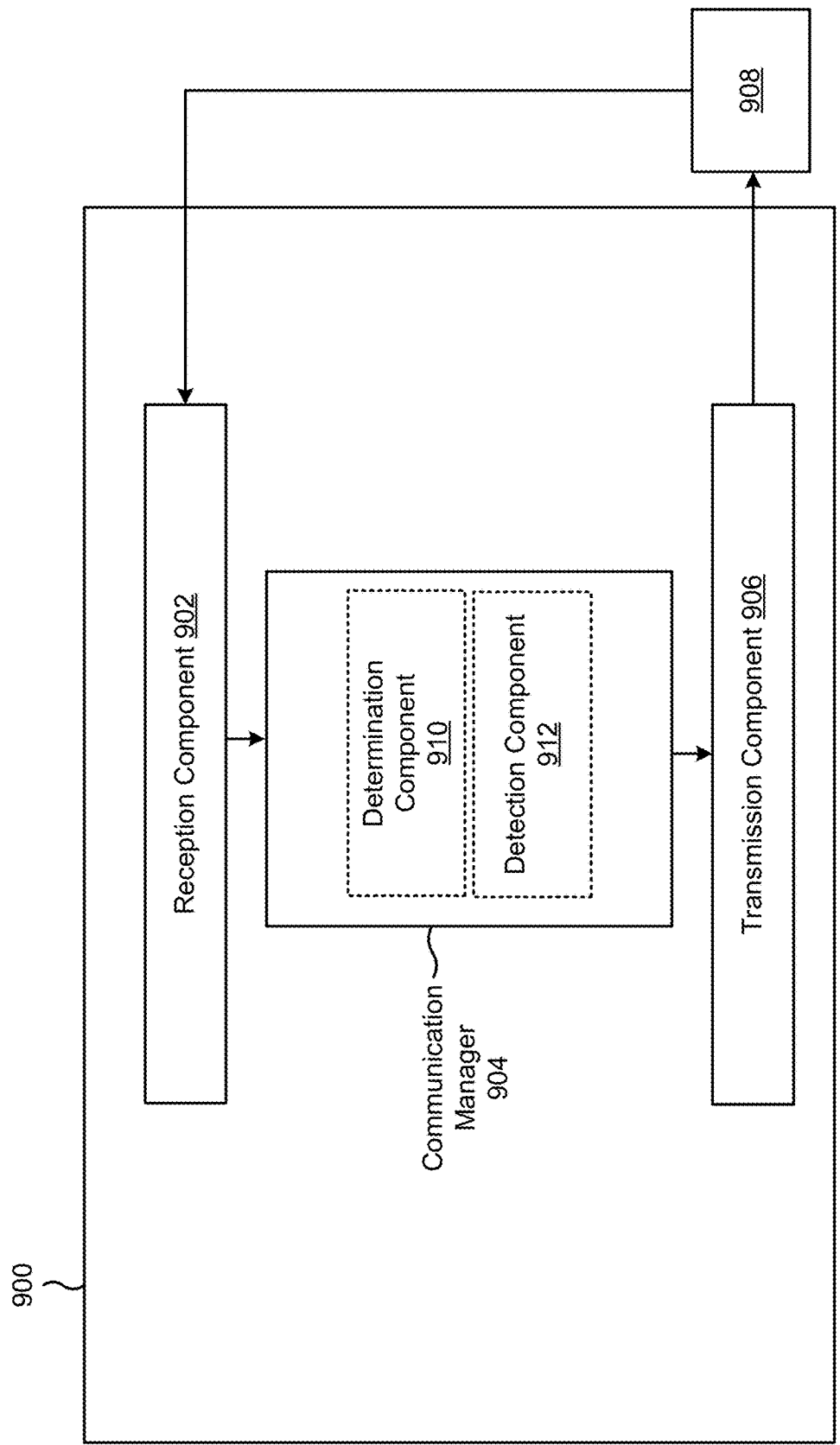
FIG. 9 is a block diagram of an example apparatus for wireless communication, in accordance with the present disclosure.

FIG. 9 is a block diagram of an example apparatus 900 for wireless communication, in accordance with the present disclosure. The apparatus 900 may be a UE, or a UE may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIG. 6. Additionally or alternatively, the apparatus 900 may be configured to perform one or more processes described herein, such as process 700 of FIG. 7, process 800 of FIG. 8, or a combination thereof. In some aspects, the apparatus 900 may include one or more components of the UE described above in connection with FIG. 2.

The reception component 902 may provide means for receiving communications, such as reference signals, control information, data communications, or a combination thereof, from the apparatus 908. The reception component 902 may provide received communications to one or more other components of the apparatus 900, such as the communication manager 904. In some aspects, the reception component 902 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE described above in connection with FIG. 2.

The transmission component 906 may provide means for transmitting communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may provide means for performing signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the UE described above in connection with FIG. 2. In some aspects, the transmission component 906 may be co-located with the reception component 902 in a transceiver.

In some aspects, the communication manager 904 may provide means for receiving a configuration of a set of resources for sidelink coordination information reports. In some aspects, the communication manager 904 may provide means for transmitting, or may cause the transmission component 906 to transmit, a sidelink coordination information request message. In some aspects, the communication manager 904 may provide means for determining at least one resource for use in transmitting or receiving a sidelink coordination information report message from a set of resources for sidelink coordination information reports. In some aspects, the communication manager 904 may provide means for transmitting, or may cause the transmission component 906 to transmit, the sidelink coordination information report message in the at least one resource. In some aspects, the communication manager 904 may provide means for receiving, or may cause the reception component 902 to receive, a sidelink coordination information report message in the at least one resource. In some aspects, the communication manager 904 may correspond to, or may include, the communication manager 140. In some aspects, the communication manager 904 may include a controller/processor, a memory, or a combination thereof, of the UE described above in connection with FIG. 2.

In some aspects, the communication manager 904 may include a set of components, such as a determination component 910, a detection component 912, or a combination thereof. Alternatively, the set of components may be separate and distinct from the communication manager 904.

In some aspects, the communication manager 904 and/or one or more components of the set of components may include or may be implemented within hardware (e.g., circuitry described in connection with FIG. 11). In some aspects, the communication manager 904 and/or one or more components of the set of components may include or may be implemented within a controller/processor, a memory, or a combination thereof, of the UE described above in connection with FIG. 2.

In some aspects, the communication manager 904 and/or one or more components of the set of components may be implemented in code (e.g., as software or firmware stored in a memory), such as the code described in connection with FIG. 11. For example, the communication manager 904 and/or a component (or a portion of a component) may be implemented as instructions or code stored in a non-transitory computer-readable medium and executable by a controller or a processor to perform the functions or operations of the communication manager 904 and/or the component. If implemented in code, the functions of the communication manager 904 and/or a component may be executed by a controller/processor, a memory, or a combination thereof, of the UE described above in connection with FIG. 2.

In some aspects, the determination component 910 may provide means for determining at least one resource for use in transmitting or receiving a sidelink coordination information report message from a set of resources for sidelink coordination information reports, means for determining to transmit the sidelink coordination information report message based at least in part on detecting a triggering event for the sidelink coordination information report message, or means for determining a resource for a virtual sidelink coordination information request in a next requesting occasion following the triggering event. In some aspects, the detection component 912 may provide means for detecting a triggering event for the sidelink coordination information report message. In some aspects, the reception component 902 may provide means for receiving an indication of a resource assignment that includes the at least one resource, or means for receiving a sidelink coordination information report message in the at least one resource. In some aspects, the transmission component 906 may provide means for transmitting the sidelink coordination information report message in the at least one resource, or means for transmitting a sidelink coordination information request message. In some aspects, the communication manager 904 may provide means for performing one or more of the functions described above.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
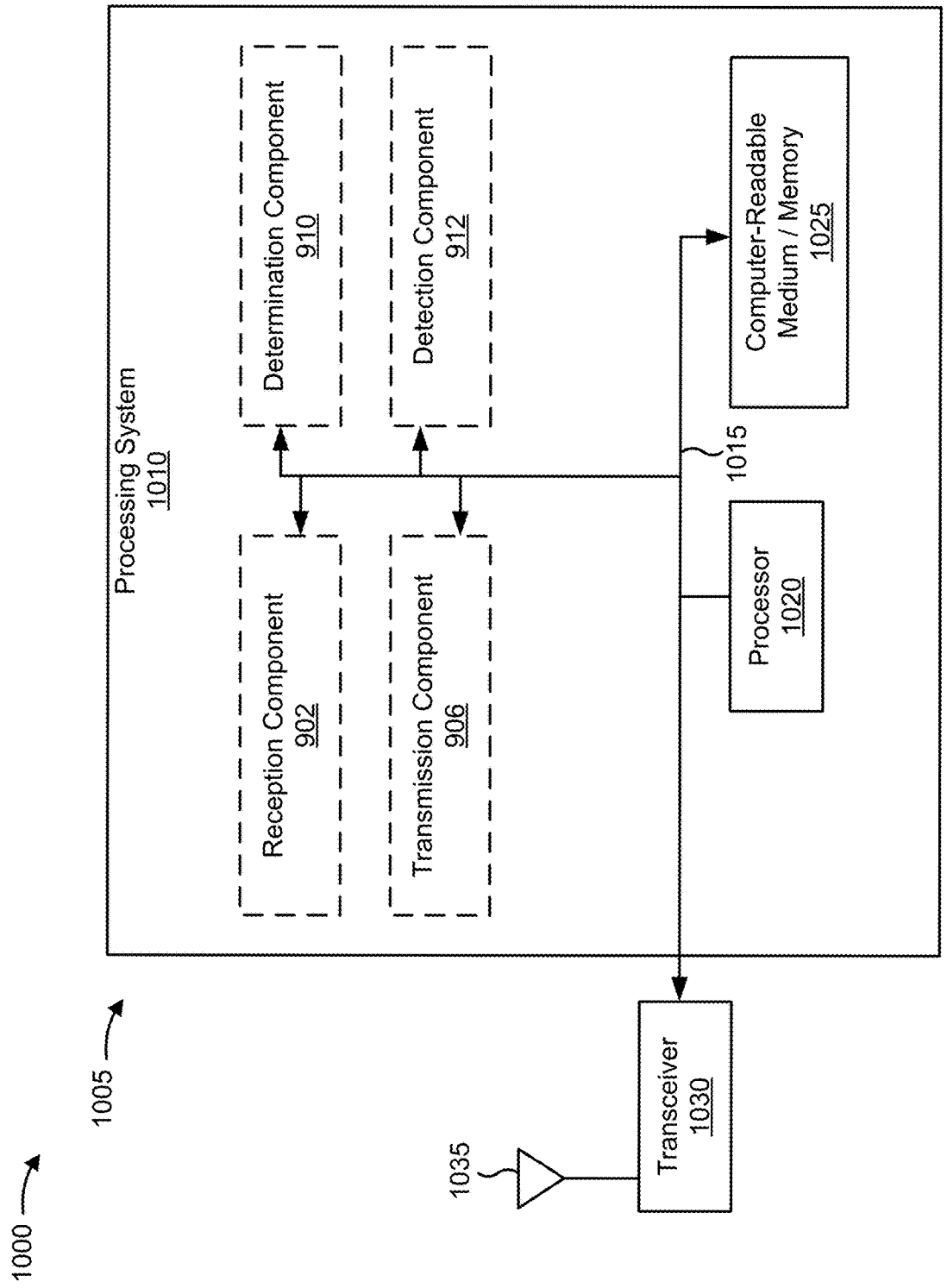
FIG. 10 is a diagram illustrating an example of a hardware implementation for an apparatus employing a processing system, in accordance with the present disclosure.

FIG. 10 is a diagram illustrating an example 1000 of a hardware implementation for an apparatus 1005 employing a processing system 1010, in accordance with the present disclosure. The apparatus 1005 may be a UE.

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, power management circuits, and/or the like.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 906, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the receive processor 258, and/or the controller/processor 280. In some aspects, the apparatus 1005 for wireless communication includes means for receiving a configuration of a set of resources for sidelink coordination information reports, means for transmitting or receiving a sidelink coordination information request message, means for determining at least one resource for use in transmitting or receiving a sidelink coordination information report message from a set of resources for sidelink coordination information reports, means for transmitting or receiving the sidelink coordination information report message in the at least one resource, means for receiving an indication of a resource assignment that includes the at least one resource, means for detecting a triggering event for the sidelink coordination information report message, means for determining to transmit the sidelink coordination information report message based at least in part on detecting the triggering event, means for determining a resource for a virtual sidelink coordination information request in a next requesting occasion following the triggering event, and/or the like. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the receive processor 258, and/or the controller/processor 280. In one configuration, the aforementioned means may be the TX MIMO processor 266, the receive processor 258, and/or the controller/processor 280 configured to perform the functions and/or operations recited herein.

FIG. 10 is provided as an example. Other examples may differ from what is described in connection with FIG. 10.

FIG. 11 is a diagram illustrating an example 1100 of an implementation of code and circuitry for an apparatus 1105, in accordance with the present disclosure. The apparatus 1105 may be a UE.

As shown in FIG. 11, the apparatus 1105 may include circuitry for determining a resource (circuitry 1120). For example, the circuitry 1120 may provide means for determining at least one resource for use in transmitting or receiving a sidelink coordination information report message from a set of resources for sidelink coordination information reports. As another example, the circuitry 1120 may provide means for determining a resource for a virtual sidelink coordination information request in a next requesting occasion following a triggering event.

As shown in FIG. 11, the apparatus 1105 may include circuitry for transmitting a message (circuitry 1125). For example, the circuitry 1125 may provide means for transmitting the sidelink coordination information report message in the at least one resource. As another example, the circuitry 1125 may provide means for transmitting a sidelink coordination information request message.

As shown in FIG. 11, the apparatus 1105 may include circuitry for receiving an indication (circuitry 1130). For example, the circuitry 1130 may provide means for receiving an indication of a resource assignment that includes the at least one resource.

As shown in FIG. 11, the apparatus 1105 may include circuitry for detecting a triggering event (circuitry 1135). For example, the circuitry 1135 may provide means for detecting a triggering event for the sidelink coordination information report message.

As shown in FIG. 11, the apparatus 1105 may include circuitry for determining to transmit a message (circuitry 1140). For example, the circuitry 1140 may provide means for determining to transmit the sidelink coordination information report message based at least in part on detecting a triggering event for the sidelink coordination information report message.

As shown in FIG. 11, the apparatus 1105 may include circuitry for receiving a message (circuitry 1145). For example, the circuitry 1145 may provide means for receiving the sidelink coordination information report message in the at least one resource. As another example, the circuitry 1145 may provide means for receiving the sidelink coordination information request message.

As shown in FIG. 11, the apparatus 1105 may include circuitry for receiving a configuration (circuitry 1150). For example, the circuitry 1150 may provide means for receiving a configuration of a set of resources for sidelink coordination information reports.

The circuitry 1120, 1125, 1130, 1135, 1140, 1145, and/or 1150 may include one or more components of the UE described above in connection with FIG. 2, such as transmit processor 264, TX MIMO processor 266, MOD 254, DEMOD 254, MIMO detector 256, receive processor 258, antenna 252, controller/processor 280, and/or memory 282.

As shown in FIG. 11, the apparatus 1105 may include, stored in computer-readable medium 1025, code for determining a resource (code 1155). For example, the code 1155, when executed by the processor 1020, may cause the apparatus 1105 to determine at least one resource for use in transmitting or receiving a sidelink coordination information report message from a set of resources for sidelink coordination information reports. As another example, the code 1155, when executed by the processor 1020, may cause the apparatus 1105 to determine a resource for a virtual sidelink coordination information request in a next requesting occasion following a triggering event.

As shown in FIG. 11, the apparatus 1105 may include, stored in computer-readable medium 1025, code for transmitting a message (code 1160). For example, the code 1160, when executed by the processor 1020, may cause the apparatus 1105 to transmit the sidelink coordination information report message in the at least one resource. As another example, the code 1160, when executed by the processor 1020, may cause the apparatus 1105 to transmit a sidelink coordination information request message.

As shown in FIG. 11, the apparatus 1105 may include, stored in computer-readable medium 1025, code for receiving an indication (code 1165). For example, the code 1165, when executed by the processor 1020, may cause the apparatus 1105 to receive an indication of a resource assignment that includes the at least one resource.

As shown in FIG. 11, the apparatus 1105 may include, stored in computer-readable medium 1025, code for detecting a triggering event (code 1170). For example, the code 1170, when executed by the processor 1020, may cause the apparatus 1105 to detect a triggering event for the sidelink coordination information report message.

As shown in FIG. 11, the apparatus 1105 may include, stored in computer-readable medium 1025, code for determining to transmit a message (code 1175). For example, the code 1175, when executed by the processor 1020, may cause the apparatus 1105 to determine to transmit the sidelink coordination information report message based at least in part on detecting a triggering event for the sidelink coordination information report message.

As shown in FIG. 11, the apparatus 1105 may include, stored in computer-readable medium 1025, code for receiving a message (code 1180). For example, the code 1180, when executed by the processor 1020, may cause the apparatus 1105 to receive the sidelink coordination information report message in the at least one resources. As another example, the code 1180, when executed by the processor 1020, may cause the apparatus 1105 to receive the sidelink coordination information request.

As shown in FIG. 11, the apparatus 1105 may include, stored in computer-readable medium 1025, code for receiving a configuration (code 1185). For example, the code 1185, when executed by the processor 1020, may cause the apparatus 1105 to receive the configuration of the set of resources for sidelink coordination information reports.

FIG. 11 is provided as an example. Other examples may differ from what is described in connection with FIG. 11.

The following provides an overview of some Aspects of the present disclosure:

Aspect 1: A method of wireless communication performed by a user equipment (UE), comprising: determining at least one resource for use in transmitting a sidelink coordination information report message from a set of resources for sidelink coordination information reports; and transmitting the sidelink coordination information report message in the at least one resource.

Aspect 2: The method of Aspect 1, further comprising: receiving an indication of a resource assignment that includes the at least one resource.

Aspect 3: The method of any of Aspects 1-2, wherein the at least one resource is determined based at least in part on a resource hopping pattern.

Aspect 4: The method of Aspect 1, wherein multiple resources of the set of resources for sidelink coordination information reports are mapped to a single resource used for a sidelink coordination information request.

Aspect 5: The method of Aspect 4, wherein the at least one resource is a fixed subset of the multiple resources.

Aspect 6: The method of Aspect 4, wherein the at least one resource is a random subset of the multiple resources.

Aspect 7: The method of Aspect 1, wherein the at least one resource is determined based at least in part on an identifier of another UE that requested the sidelink coordination information report message.

Aspect 8: The method of any of Aspects 1 or 7, wherein the at least one resource is determined based at least in part on an identifier of the UE.

Aspect 9: The method of any of Aspects 1 or 7-8, wherein the at least one resource is determined based at least in part on a periodicity of reporting occasions for sidelink coordination information reports.

Aspect 10: The method of Aspect 1, further comprising: determining to transmit the sidelink coordination information report message based at least in part on detecting a triggering event for the sidelink coordination information report message.

Aspect 11: The method of Aspect 10, wherein the at least one resource is randomly determined in a next reporting occasion following the triggering event.

Aspect 12: The method of Aspect 10, further comprising: determining a resource for a virtual sidelink coordination information request in a next requesting occasion following the triggering event.

Aspect 13: The method of Aspect 12, wherein the at least one resource is determined based at least in part on the resource for the virtual sidelink coordination information request.

Aspect 14: The method of any of Aspects 10 or 12-13, wherein the at least one resource is determined based at least in part on an identifier of another UE associated with the triggering event.

Aspect 15: The method of any of Aspects 1-14, wherein the set of resources for sidelink coordination information reports are in multiple slots in a reporting period.

Aspect 16: The method of any of Aspects 1-15 further comprising: receiving a configuration of the set of resources for sidelink coordination information reports.

Aspect 17: The method of any of Aspects 1-16 further comprising: receiving a sidelink coordination information request message.

Aspect 18: A method of wireless communication performed by a user equipment (UE), comprising: receiving a configuration of a set of resources for sidelink coordination information reports; and receiving a sidelink coordination information report message in at least one resource from the set of resources for sidelink coordination information reports.

Aspect 19: The method of Aspect 18, wherein the at least one resource is based at least in part on an identifier of another UE that transmitted the sidelink coordination information report message.

Aspect 20: The method of any of Aspects 18-19, wherein the at least one resource is based at least in part on an identifier of the UE.

Aspect 21: The method of any of Aspects 18-20, wherein the at least one resource is based at least in part on a periodicity of reporting occasions for sidelink coordination information reports.

Aspect 22: The method of Aspect 18, wherein the UE is associated with a triggering event for the sidelink coordination information report message, and the at least one resource is based at least in part on an identifier of the UE.

Aspect 23: The method of any of Aspects 18-21 further comprising: transmitting a sidelink coordination information request message.

Aspect 24: An apparatus for wireless communication at a device, comprising a processor; memory coupled with the processor; and instructions stored in the memory and executable by the processor to cause the apparatus to perform the method of one or more of Aspects 1-17

Aspect 25: A device for wireless communication, comprising a memory and one or more processors coupled to the memory, the one or more processors configured to perform the method of one or more of Aspects 1-17.

Aspect 26: An apparatus for wireless communication, comprising at least one means for performing the method of one or more of Aspects 1-17.

Aspect 27: A non-transitory computer-readable medium storing code for wireless communication, the code comprising instructions executable by a processor to perform the method of one or more of Aspects 1-17.

Aspect 28: A non-transitory computer-readable medium storing a set of instructions for wireless communication, the set of instructions comprising one or more instructions that, when executed by one or more processors of a device, cause the device to perform the method of one or more of Aspects 1-17.

Aspect 29: An apparatus for wireless communication at a device, comprising a processor; memory coupled with the processor; and instructions stored in the memory and executable by the processor to cause the apparatus to perform the method of one or more of Aspects 17-23.

Aspect 30: A device for wireless communication, comprising a memory and one or more processors coupled to the memory, the one or more processors configured to perform the method of one or more of Aspects 17-23.

Aspect 31: An apparatus for wireless communication, comprising at least one means for performing the method of one or more of Aspects 17-23.

Aspect 32: A non-transitory computer-readable medium storing code for wireless communication, the code comprising instructions executable by a processor to perform the method of one or more of Aspects 17-23.

Aspect 33: A non-transitory computer-readable medium storing a set of instructions for wireless communication, the set of instructions comprising one or more instructions that, when executed by one or more processors of a device, cause the device to perform the method of one or more of Aspects 17-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories that store processor-executable code; and
   one or more processors coupled to the one or more memories, the one or more processors configured to execute the processor-executable code to cause the UE to:
      receive an indication of a set of resources for sidelink coordination information reports,
         wherein the indication indicates a resource hopping pattern for the set of resources for the sidelink coordination information reports;
      detect a triggering event for transmitting a sidelink coordination information report message, wherein the triggering event is different from a sidelink coordination information request message;
      select at least one resource, from the set of resources, for transmission of the sidelink coordination information report message; and
      transmit, to another UE, the sidelink coordination information report message in the at least one resource in accordance with the resource hopping pattern based at least in part on the triggering event.

2. The UE of claim 1, wherein the sidelink coordination information report message identifies resources selected by the UE for a transmission of the other UE.

3. The UE of claim 1, wherein the one or more processors are further configured to execute the processor-executable code to cause the UE to:
   receive an indication of a resource assignment for the at least one resource.

4. The UE of claim 1, wherein the set of resources for the sidelink coordination information reports are in multiple slots.

5. The UE of claim 1, wherein the set of resources for the sidelink coordination information reports are in multiple slots in a reporting period.

6. The UE of claim 1, wherein multiple resources of the set of resources for the sidelink coordination information reports are mapped to a single resource used for a sidelink coordination information request, and
   wherein the at least one resource is a fixed subset of the multiple resources or a random subset of the multiple resources.

7. The UE of claim 1, wherein the at least one resource is selected based at least in part on an identifier of the other UE that requested the sidelink coordination information report message or an identifier of the UE.

8. The UE of claim 1, wherein the at least one resource is selected based at least in part on a periodicity of reporting occasions for the sidelink coordination information reports.

9. The UE of claim 1, wherein the at least one resource is randomly selected in a next reporting occasion following the triggering event.

10. The UE of claim 1, wherein the one or more processors are further configured to execute the processor-executable code to cause the UE to:
    determine a resource for a virtual sidelink coordination information request in a next requesting occasion following the triggering event.

11. The UE of claim 10, wherein the at least one resource is selected based at least in part on the resource for the virtual sidelink coordination information request.

12. The UE of claim 1, wherein the at least one resource is selected based at least in part on an identifier of the other UE associated with the triggering event.

13. The UE of claim 1, wherein the at least one resource is selected for periodic reporting in accordance with the resource hopping pattern.

14. The UE of claim 1, wherein the indication is received via a relay.

15. The UE of claim 1, wherein the triggering event comprises a satisfaction of a threshold quantity of consecutive lost packets in unicast communication between the UE and the other UE.

16. A user equipment (UE) for wireless communication, comprising:
    one or more memories that store processor-executable code; and one or more processors coupled to the one or more memories, the one or more processors configured to execute the processor-executable code to cause the UE to:
  receive, based at least in part on receiving an indication of a set of resources for sidelink coordination information reports, a sidelink coordination information request message,
    wherein the indication indicates a resource hopping pattern for the set of resources for the sidelink coordination information reports;
  detect a triggering event for transmitting a sidelink coordination information report message, wherein the triggering event is different from the sidelink coordination information request message;
  select at least one resource, from the set of resources, for transmission of the sidelink coordination information report message; and
  transmit, to another UE, the sidelink coordination information report message in the at least one resource in accordance with the resource hopping pattern based at least in part on the triggering event.

17. The UE of claim 16, wherein the sidelink coordination information report message identifies resources selected by the UE for a transmission of the other UE.

18. The UE of claim 16, wherein the one or more processors are further configured to execute the processor-executable code to cause the UE to:
  receive an indication of a resource assignment that includes the at least one resource.

19. The UE of claim 16, wherein the set of resources for the sidelink coordination information reports are in multiple slots.

20. The UE of claim 16, wherein the set of resources for the sidelink coordination information reports are in multiple slots in a reporting period.

21. The UE of claim 16, wherein multiple resources of the set of resources for the sidelink coordination information reports are mapped to a single resource used for a sidelink coordination information request, and
  wherein the at least one resource is a fixed subset of the multiple resources or a random subset of the multiple resources.

22. The UE of claim 16, wherein the at least one resource is selected based at least in part on an identifier of the other UE that requested the sidelink coordination information report message or an identifier of the UE.

23. The UE of claim 16, wherein the at least one resource is selected based at least in part on a periodicity of reporting occasions for the sidelink coordination information reports.

24. A user equipment (UE) for wireless communication, comprising:
  one or more memories that store processor-executable code; and
  one or more processors coupled to the one or more memories, the one or more processors configured to execute the processor-executable code to cause the UE to:
    receive, an indication of a set of resources for sidelink coordination information reports,
      wherein the indication indicates a resource hopping pattern for the set of resources for the sidelink coordination information reports; and
    receive, from another UE, based at least in part on a triggering event for transmitting a sidelink coordination information report message, wherein the triggering event is different from a sidelink coordination information request message, the sidelink coordination information report message in at least one resource selected from the set of resources for the sidelink coordination information reports in accordance with the resource hopping pattern.

25. The UE of claim 24, wherein the at least one resource is based at least in part on an identifier of the other UE that transmitted the sidelink coordination information report message or an identifier of the UE.

26. The UE of claim 24, wherein the at least one resource is based at least in part on a periodicity of reporting occasions for the sidelink coordination information reports.

27. The UE of claim 24, wherein the at least one resource is based at least in part on an identifier of the UE.

28. A user equipment (UE) for wireless communication, comprising:
  one or more memories that store processor-executable code; and
  one or more processors coupled to the one or more memories, the one or more processors configured to execute the processor-executable code to cause the UE to:
    transmit, based at least in part on receiving an indication of a set of resources for sidelink coordination information reports, a sidelink coordination information request message,
      wherein the indication indicates a resource hopping pattern for the set of resources for the sidelink coordination information reports; and
    receive, from another UE, based at least in part on a triggering event for transmitting a sidelink coordination information report message, wherein the triggering event is different from the sidelink coordination information request message, the sidelink coordination information report message in at least one resource selected from the set of resources for the sidelink coordination information reports in accordance with the resource hopping pattern.

29. The UE of claim 28, wherein the at least one resource is based at least in part on an identifier of the other UE that transmitted the sidelink coordination information report message or an identifier of the UE.

30. The UE of claim 28, wherein the at least one resource is based at least in part on a periodicity of reporting occasions for the sidelink coordination information reports.

* * * * *